United States Patent [19]
Spangler

[11] Patent Number: 5,684,053
[45] Date of Patent: Nov. 4, 1997

[54] PROCESS FOR RECLAIMING PAINT AND A PAINT FORMULATION

[75] Inventor: John M. Spangler, Peoria, Ill.

[73] Assignee: Caterpillar Inc., Peoria, Ill.

[21] Appl. No.: 522,055

[22] Filed: Aug. 31, 1995

[51] Int. Cl.[6] .................................. C08J 11/04; C02F 3/00
[52] U.S. Cl. ........................ 521/48; 521/48.5; 521/45; 521/45.5; 210/613; 134/38
[58] Field of Search ........................... 521/48, 48.5, 45, 521/45.5; 210/613; 134/38

[56] References Cited

U.S. PATENT DOCUMENTS

| | | | |
|---|---|---|---|
| 3,515,575 | 6/1970 | Arnold | 117/102 |
| 3,736,277 | 5/1973 | Bender | 521/48 |
| 4,303,559 | 12/1981 | Trost | 521/48 |
| 4,607,592 | 8/1986 | Richter | 118/689 |
| 5,092,928 | 3/1992 | Spangler | 106/287.34 |
| 5,169,539 | 12/1992 | Turosey et al. | 210/712 |
| 5,352,250 | 10/1994 | Geke et al. | 210/710 |
| 5,393,390 | 2/1995 | Freese et al. | 204/131 |

OTHER PUBLICATIONS

Article entitled: "Plating and Surface Finishing" Jrnl. of the Amer. Electroplaters & Surface Finishers Society, Inc. Jul. 1995, vol. 82, No. 7.

Primary Examiner—Paul R. Michl
Assistant Examiner—Olga Asinovsky
Attorney, Agent, or Firm—Pankaj M. Khosla; Kenneth A. Rhoads

[57] ABSTRACT

A process for recovering paint overspray particles includes segregating the paint overspray by color and type, and detackifying, dewatering, drying and particulizing the dried, dewatered, detackified, segregated paint overspray compounds. The resultant compounds is used as paint additive.

5 Claims, 1 Drawing Sheet

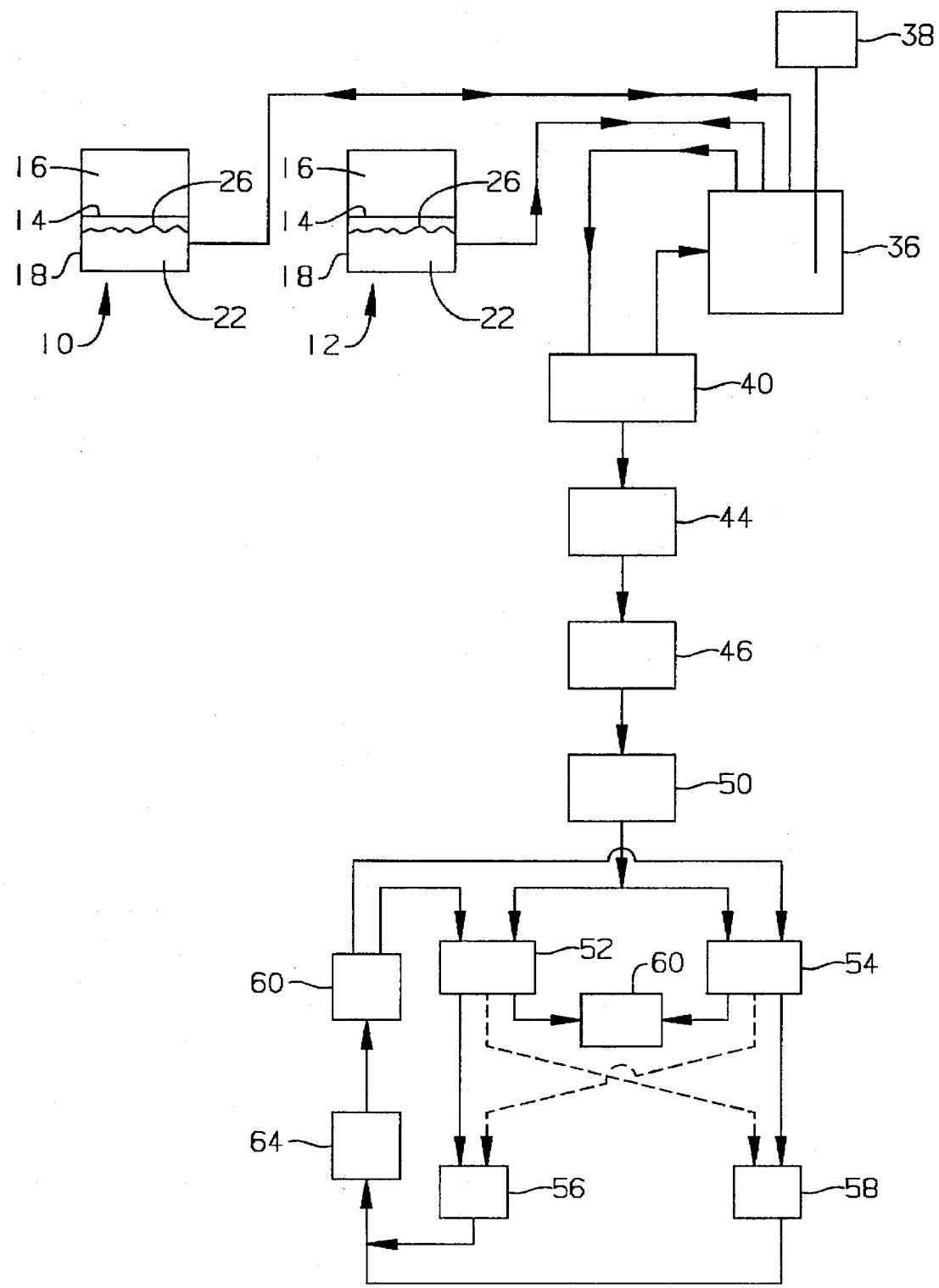

PROCESS FOR RECLAIMING PAINT AND A PAINT FORMULATION

TECHNICAL FIELD

This invention relates generally to a process for reclaiming paint overspray particles and a paint formulation, and more particularly to a process for reclaiming paint overspray particles for reuse as a component in high quality paint products and a paint formulation using the particles.

BACKGROUND ART

Spray painting either by a robot or human operator generates a large amount of overspray waste. Even with the wide spread use of modern electrostatic spray technology about half of all paint purchased is wasted. Overspray paint byproduct generated in paint spraying operations takes the form of either a liquid sludge or semi-cured product embedded on a filter media. Water-wash paint booth systems capture oversprayed paint by using positive air pressure to force the particles into a cascading curtain of water. Over a period of time these particles of paint accumulate and form a sticky agglomeration of overspray material in the bottom of the water-wash pit or tank.

The water-wash design, because of its high efficiency and wet byproducts characteristics, has faced substantial challenges with the promulgation of more restrictive landfill regulations. It is becoming increasingly prohibitive, both economically and environmentally, to dispose of paint waste byproducts because of these regulations. Therefore, it is desirable to avoid the problem of disposal by recovering and recycling the overspray paint waste produced into a useful high quality paint product.

One approach of collecting paints from a water-wash spray booth is described in U.S. Pat. No. 3,515,575, issued Jun. 2, 1970 to Roger F. Arnold. The Arnold process adds water-soluble polyelectrolytes to the water system of the water-wash spray booth to disperse paint droplets in the aqueous system. This reference also teaches that compounds containing various alkalis, wetting agents, absorbents, defoamers and the like were dissolved in the water to reduce tackiness of the paint waste product.

Another approach for recycling paint overspray is proposed in U.S. Pat. No. 4,607,592, issued Aug. 26, 1986 to Wolfgang Richter. The Richter process requires a particular spray booth arrangement and a special apparatus for recovering and processing the paint overspray. Moreover, since the Richter process does not detackify the paint waste, additional problems are created. In particular, tacky waste products are prone to build up on booth surfaces, special equipment is required to transport and process the tacky waste materials, and the recovered waste must be immediately reprocessed.

More recently, U.S. Pat. No. 5,092,928, issued Mar. 3, 1992 to John M. Spangler, discloses a process for recovering paint overspray particles for use in paint. This reference teaches the use of hydrophobic fumed silica in detackification of overspray paint particles. The recovered encapsulated particles may be mixed with a suitable solvent, milled and blended with preselected additive materials to form a desirable reconstituted paint material. These overspray particles, however, are not maintained by a separation of color and type.

All of the above processes are for detackifying paint overspray particles. Furthermore, the prior art processes undesirably does not segregate the paint by color or type to produce a primary component of a high quality paint product.

The present invention is directed to overcoming the problems set forth above. It is desirable to segregate the overspray paint compound by color and type to produce a consistent quality raw material. It is also desirable to detackify, remove the bacteria, dewater, dry and particularizing the paint sludge for use in a high quality reusable paint formulation.

DISCLOSURE OF THE INVENTION

In accordance with one aspect of the present invention, a process for recovering paint overspray particles includes maintaining by color and type a separation of the paint compounds, individually and sequentially detackifying the separated paint overspray compound, dewatering the detackified separated paint overspray compound, drying the dewatered detackified paint overspray compound to a moisture content less than about 2 percent and then particularizing the dried, dewatered, detackified separated paint overspray resultant to a size less than about 20 microns.

In another aspect of the invention a paint formulation has a paint additive, the paint formulation comprises a liquid paint, and a paint additive made from a process for reclaiming paint compounds from water. The process comprising the steps of separating the paint overspray compounds by color and type, detackifying the segregated paint overspray compounds, dewatering the detackified segregated paint overspray compounds, drying the dewatered, detackified, segregated paint overspray compounds to a moisture content less than 2 percent, and particulizing the dried, dewatered, detackified, segregated paint overspray compound to a size less than 20 microns.

BRIEF DESCRIPTION OF THE DRAWINGS

The sole figure is a schematic illustration of the process for recovering paint overspray.

BEST MODE FOR CARRYING OUT THE INVENTION

A pair of schematic illustrated paint booths 10,12 suitable for carrying out a preferred embodiment of the present invention is shown in the drawing. The process, without exception, maintains by color and type a separation of the paint compounds. It is recognized that more paint booths could be added as needed to maintain a separation of the paint compounds by color and type. Each of the paint booths 10,12 is a conventional down draft, water wash type paint spray booth having a paint application station disposed in the booth 10 and includes one or more spray guns (not shown) connected to a source of paint, the operation of which may be controlled by either a robot or human operator.

Each of the paint booths 10,12 has an open metal grate floor 14 or the like separating the booth into an upper paint spray chamber 16 and a lower sludge tank 18. Each of the paint booths 10,12 has their own sludge tank 18 having a supply of water 22 defining a water surface 26. There is no fluid transfer permitted between the respective sludge tanks 18 to insure that the paint compounds are segregated by color and type.

Exhaust fans (not shown) provide for the movement of air from the interior of the booth 10,12 to the external environment in a conventional manner. Air carrying paint overspray compounds is directed from the upper chamber 16 of the booth 10, through, or past, the open metal grate floor 14. After passing through the floor grate 14, the air stream containing the overspray paint compounds are directed towards the sludge tank 18.

The process individually, sequentially passes each color and type of paint compound separately through the remainder of the process. The process includes the step of detackifying the segregated paint overspray compounds. To recover the segregated paint overspray compound from the sludge tank 18, it is detackified. In the preferred embodiment of the present invention, a layer of hydrophobic fumed silica particles having a particle size of about 16 nm and a BET (Brunauer, Emmett, Teller) surface area of about 110 m$^2$/g, is formed on the surface 26 of the water 22. Hydrophobic fumed silica having these characteristics is commercially available from Degussa AG, Frankfurt, W. Germany, under the trade name Aerosil® R972. When individual, or a small number of joined, paint compounds are brought into contact with hydrophobic fumed silica particles having the above characteristics, the much smaller silica particles become attached to the surface of the larger paint compounds and effectively cover, or encapsulate the paint compounds. The encapsulated segregated paint overspray compounds are not tacky, have a tendency to agglomerate, and are easy to collect and handle by conventional mechanical means. The hydrophobic fumed silica particles are not deleterious to a paint formed of the encapsulated particles. It is recognized that other detackification and coagulation agents could be used such as cationic polyelectrolytes, metal salts, urea, and melamine formaldehyde resins without departing from the subject invention.

The water 22 and detackified segregated paint overspray compounds are then transferred to a processing reservoir 36. It is recognized that there could be more than one processing reservoirs 36. Optionally, the process may include the step of conditioning the water 22 and detackified segregated paint overspray compounds to remove bacteria. Over a period of time, the water 22 and detackified segregated paint overspray compounds in the sludge tanks 18 may become anaerobic and need to be conditioned to remove the bacteria that has formed naturally. To remove the bacteria a biocide such as hydrogen peroxide is added to the processing reservoir 36 to kill the bacteria. The biocide maybe mixed with the water 22 and detackified segregated paint overspray compound using a mechanical mixer 38. It is recognized that other types of biocides are commercially available such as Troysan 174.

The process includes the step of dewatering the detackified segregated paint over spray compounds. From the reservoir 36, the water and detackified, segregation paint overspray compounds are transferred to a dewatering device 40 for removal of the water. The dewatering devices used is commercially available from Binks Mfg., 9201 W. Belmont Ave., Franklin Park, Ill. model no. 150.

The process includes the step of drying the solids of the detackified, segregated paint overspray compounds. From the dewatering device 40 the solids of the detackified, segregated paint overspray compounds are transferred to a dryer 44. The water from the dewatering device 40 maybe either disposed of at this point or transferred back to the reservoir 36. In most cases the water in the water reservoir 36 is recycled back to the sludge tanks 18 of the paint booths 10,12. The dryer 44 dries the dewatered detackified, segregated paint overspray compounds to a moisture content less than about 5 percent, and preferably the moisture content is less than about 2 percent. The dried, detackified, segregated paint overspray compounds exits the dryer in rock form having a mean cross-section dimension of approximately 50 mm to 75 mm. It is critical in some applications to dry the sludge at a relatively low temperature to prevent a change in pigment color. The dryer 44 in the preferred embodiment is a commercially available rotary turbo dryer model number L12 manufactured by Wyssmont, P.O. Box 1397, 1470 Bergan Blvd., Fort Lee, N.J.

The process further includes the step of particulizing the dried, dewatered, detackified, segregated paint overspray compounds to a size less than about 20 microns. From the dryer 44 the dried, dewatered, detackified, segregated paint overspray compounds is transferred to a lump breaker 46 whereupon the compounds are reduced in size to a mean cross-section dimension of approximately 6.35 mm. The lump breaker 46 is a model number LB1515 manufactured by Jacobson Companies, 2445 Nevada Ave. Minneapolis, Minn.

From the lump breaker 46 the dried, dewatered, detackified, segregated paint overspray compound is transferred to a holding hopper 50. The holder hopper 50 is a model #4×4 commercially available from Mac Equipment, Box 205, Highway 75 South, Sabetha, Kans. 66534. From the holding hopper 50 the material can be selectively transferred to a first filter receiver 52 or a second filter receiver 54. The filter receivers 52,54 are a model #39AVRC14 also commercially available from Mac Equipment.

From the first filter receiver 52 the compounds can be selectively transferred to a hammer mill 56, a jet mill 58, or to a finished product area 60 for packaging or the like in a manner to be presently described. From the second filter receiver 54 the dried, dewatered, detackified, segregated paint overspray compounds can also be selectively transferred to the hammer mill 56, the jet mill 58, or to the finished product area 60 for packaging or the like in a manner to be presently described. The hammer mill is commercially available from the Jacobson Companies, 2445 Nevada Ave., Minneapolis, Minn. The jet mill 58 which is also referred to as an air impact mill is commercially available from Jet Pulverizer Company, Morristown, N.J.

The first operation in the step of particulizing the compound is to particulize the compounds in the hammer mill 56. The hammer mill 56 particulizes the compounds to a mean cross-section dimension of approximately 80 microns. From the hammer mill 56 the compounds are pneumatically transferred to a diverter valve 60. The diverter valve 60 selectively transfer the compounds to either the first filter receiver 52 or the second filter receiver 54 as will presently be described. Compounds that have been particulized by the hammer mill 56 are pneumatically transferred to the second filter receiver 54.

The second operation in the step of particulizing the compounds is to particulize the compounds in the jet mill 58. From the second filter receiver 54 the compounds are pneumatically transferred to the jet mill 58. The jet mill 58 particulizes the compounds a mean cross-section dimension less than about 20 microns.

From the jet mill 58 the compounds are pneumatically transferred to the diverter vale 60. The diverter valve 60 pneumatically transfers the compounds to the first filter receiver 52. From the first filter receiver 52 the compounds are pneumatically transferred to the finished product area 60 for packaging or the like. The compounds are transferred to the first filter receiver to insure that all of the compounds have been processed to a mean cross-section dimension less than about 20 microns.

A sampling valve 64 is located prior to the diverter valve 60 to check the particle size of the compounds.

It is recognized that other types and models of paint booths, lump breakers, dryers, holding hoppers, filter receivers, hammer mills, and pulverisers could be used without departing from the subject invention.

A paint formulation having a paint compound made from the process as set forth above comprising, a liquid paint, the resultant detackified paint compound, the resultant detackified paint compound having a size less than about 20 microns, and the resultant detackified paint compound having a moisture content less than about 2 percent.

Another paint formulation having a paint additive, comprises, a liquid paint, and a paint additive made from the process for reclaiming paint compounds from water. The process comprising the steps of, separating the paint overspray compounds by color and type, detackifying the segregated paint overspray compounds, dewatering the detackified segregated paint overspray compounds, drying the dewatered, detackified, segregated paint overspray compounds to a moisture content less than 2 percent, and particulizing the dried, dewatered, detackified, segregated paint overspray compound to a size less than 20 microns.

Other aspects, objects and advantages of the invention can be obtained from a study of the drawings, the disclosure, and the appended claims.

INDUSTRIAL APPLICABILITY

The subject process for reclaiming paint, maintains by color and type a separation of the paint compounds. The different colors and types of paint are not permitted to mix to ensure a consistent feedstock for the process.

A reclaimed pigment resin material (PPR) produced by the above described process was incorporated into a standard electrodeposition alkyd coating. Painted panels, which were prepared utilizing this coating, were tested in accordance with ASTM standards, as indicated below, to determine the quality of the reconstituted material. The results of this test are as follows:

| 240 HOUR SALT SPRAY CORROSION TEST ASTM STANDARD D1654 | | |
|---|---|---|
| PRODUCT | PERCENT RECLAIM (PPR) | CREEP (MM) |
| low temperature alkyd e-coat | 0% | 19.00 |
| low temperature alkyd e-coat | 5% | 3.175–6.35 |
| low temperature alkyd e-coat | 10% | 3.175–4.76 |

Thus, a coating having excellent corrosion resistance, very good hardness, and good adhesion characteristics was produced using paint pigment resin particles as a component of the reconstituted paint material.

A significant advantage of the present invention is the ability to reclaim the recovered paint particles and use the recovered product as a component in high quality paint products. Because the paint overspray particles are reused, the problem of sludge disposal is avoided.

Other aspects, objects and advantages of this invention can be obtained from a study of the drawings, the disclosure, and the appended claims.

I claim:

1. A process for reclaiming paint compounds from water, comprising the steps of:

maintaining said paint compounds separate by color;

treating said paint compounds separated by color, individually and sequentially to remainder of said process steps, as follows;

detackifying said separated paint compound by adding hydrophobic fumed silica;

dewatering the detackified separated paint compound;

conditioning the dewatered and detackified paint compound by the addition of a biocide to remove bacteria;

drying the dewatered detackified paint compound to a moisture content less than about 2 percent; and particulizing the dried, dewatered, detackified paint compounds to a size less than about 20 microns.

2. A process for reclaiming paint compounds from water, as set forth in claim 1, wherein the step of particulizing the compounds includes transferring the dried, dewatered, detackified, segregated paint overspray compounds to a lump breaker reducing the compounds to a mean cross-section dimension of approximately 6.35 mm.

3. A process for reclaiming paint compounds from water, as set forth in claim 2, wherein the step of particulizing the compounds further includes transferring the compounds from the lump breaker to a holding hopper and selectively transferring the compounds from the holding hopper to a first filter receiver or a second filter receiver.

4. A process for reclaiming paint compounds from water, as set forth in claim 3, wherein the step of particulizing the compounds further includes transferring the compounds from the first filter receiver to a hammer mill and particulizing the compounds to a mean cross-section dimension of approximately 80 microns.

5. A process for reclaiming paint compounds from water, as set forth in claim 4, wherein the step of particulizing the compounds further includes transferring the compounds from the hammer mill to the second filter receiver, and transferring the compounds to a jet mill particulizing the compounds to a size less than 20 microns.

* * * * *